(12) United States Patent
Deutscher

(10) Patent No.: US 9,410,785 B1
(45) Date of Patent: Aug. 9, 2016

(54) TAPE MEASURE DEVICE AND ATTACHMENT FOR MEASURING AND CUTTING DRYWALL

(71) Applicant: Edward Deutscher, Safety Harbor, FL (US)

(72) Inventor: Edward Deutscher, Safety Harbor, FL (US)

(*) Notice: Subject to any disclaimer, the term of this patent is extended or adjusted under 35 U.S.C. 154(b) by 0 days.

(21) Appl. No.: 14/933,868

(22) Filed: Nov. 5, 2015

Related U.S. Application Data

(63) Continuation-in-part of application No. 14/696,602, filed on Apr. 27, 2015, now Pat. No. 9,194,683.

(51) Int. Cl.
*G01B 3/10* (2006.01)

(52) U.S. Cl.
CPC ............ *G01B 3/1084* (2013.01); *G01B 3/1082* (2013.01); *G01B 2003/1076* (2013.01); *G01B 2003/1079* (2013.01); *G01B 2003/1089* (2013.01)

(58) Field of Classification Search
CPC .. G01B 3/1082; G01B 3/1076; G01B 3/1079; G01B 3/1084; G01B 2003/1076; G01B 2003/1079; G01B 2003/1089
USPC ........ 33/668, 42, 27.031, 27.03, 27.032, 755, 33/768, 770
See application file for complete search history.

(56) References Cited

U.S. PATENT DOCUMENTS

| | | | |
|---|---|---|---|
| 1,145,244 A | 7/1915 | Hoffmann et al. | |
| 3,120,059 A * | 2/1964 | Quenot | G01B 3/1084 33/27.03 |
| 3,509,631 A * | 5/1970 | Shimoyama | B43L 9/04 33/27.01 |
| 4,103,426 A * | 8/1978 | Robin | B43L 9/045 33/27.03 |
| 5,426,863 A | 6/1995 | Biggel | |
| 5,542,184 A * | 8/1996 | Beard | B26B 29/06 30/293 |
| 5,735,052 A | 4/1998 | Lin | |
| 5,782,007 A * | 7/1998 | Harris | B26B 29/06 33/27.03 |
| 6,694,622 B2 | 2/2004 | Kim | |
| 6,826,845 B2 | 12/2004 | Pritchard | |
| 6,912,799 B1 * | 7/2005 | Smith | B25H 7/04 33/27.031 |
| 7,266,905 B1 * | 9/2007 | Lee | G01B 3/1056 33/758 |
| 8,819,954 B1 * | 9/2014 | Fernandez | G01B 3/1084 33/42 |
| 9,194,683 B1 * | 11/2015 | Deutscher | G01B 3/1084 |
| 2002/0073570 A1 * | 6/2002 | Conder | G01B 3/1056 33/758 |
| 2007/0124950 A1 * | 6/2007 | Wirtz | G01B 3/1082 33/759 |
| 2008/0141549 A1 | 6/2008 | Brown | |
| 2008/0282567 A1 * | 11/2008 | Ribby | G01B 3/1082 33/755 |
| 2012/0317828 A1 * | 12/2012 | Richard | G01B 3/1056 33/701 |

* cited by examiner

*Primary Examiner* — Christopher Fulton
(74) *Attorney, Agent, or Firm* — The Concept Law Group, P.A.; Scott D. Smiley; Mark C. Johnson

(57) ABSTRACT

A tape measure attachment device having a securing portion shaped to receive a portion of a tape member of a tape measure, an extension member coupled to the securing portion to form a joint and disposed at a substantially perpendicular orientation to the securing portion, the extension member having an outer face, and having a tab coupled to the extension member and having an upper face defining at least one aperture, a first position along a tab translation path with the tab disposed at a substantially perpendicular orientation to the extension member and extending in a direction away from the outer face of the extension member, and a second position along a tab translation path with the tab disposed at a substantially parallel orientation to the extension member.

19 Claims, 11 Drawing Sheets

TAPE MEASURE DEVICE AND ATTACHMENT FOR MEASURING AND CUTTING DRYWALL

FIELD OF THE INVENTION

The present invention relates generally to measuring and cutting drywall, and, more particularly, relates to a tape measure attachment device and method for simultaneously holding a tape measure and a tool while measuring and cutting drywall.

BACKGROUND OF THE INVENTION

It is well known that sheet materials, such as drywall, i.e., plasterboard, Gyproc®, etc., is commonly used in the construction of houses, buildings, and the like. Measuring and cutting, i.e., scoring, the drywall can be a tedious and time-consuming task. The scoring process begins with a user measuring the length and width of the area where the drywall is to be placed using a measuring device, such as a ruler or tape measure. Thereafter, the user provides reference marks on the drywall corresponding to the dimensions of the measured area. In some instances, a straight edge is placed on the drywall and lined up in accordance with the reference marks.

A sheet rock knife, utility knife, etc., is used to cut along the straight edge through a first layer of the drywall, preferably without cutting completely through the drywall. In some instances, the user simultaneously holds a first end of the tape measure flush against a pencil and/or utility knife in one hand, and a second end of the tape measure having the reel portion in the alternate hand, such that the tape measure extends across the drywall. The user then slides both hands down the drywall so that the pencil and/or utility knife will score a line that is parallel to the edge of the drywall. This often leads to inaccurate results and is unsafe for the user wielding the utility knife. The drywall is turned over and a portion of the drywall is bent at an approximate ninety degree angle. Such configuration allows the user to cut through the backside of the drywall, along the bend, to remove the fractured portion of the drywall that is to be discarded by the user.

Devices that improve upon the basic scoring of drywall are well-known. For example, at least one known device utilizes a utility knife permanently coupled to a tape measure. Such configuration does not allow the user to employ the tape measure independent of the utility knife. Another known device utilizes a utility knife that must be secured to the tape measure through nuts, bolts, or other fastening mechanisms. Following use, the utility knife must be unfastened from the tape measure. Such configuration is time consuming and may result in the risk of a user losing the various components required for assembly.

An additional known device utilizes a cutter attached to an end of a tape measure. Such configuration leaves the blade of the cutter exposed, which is hazardous for the user. As an added problem, the method of locking the blade requires tedious maneuvering when the user desires to remove or change the blade. Yet another known device utilizes a T-shape ruler that is bulky and inconvenient to carry and manipulate during the scoring of the drywall.

Further, additional known devices for cutting, marking, and/or scoring drywall also do not provide users the ability effectively and efficiently generate arcs or circles in said drywall or other mediums. Those devices that do give users the ability to generate arcs or circles include housings or tapes of the tape measure that are specially designed, leading to an overall increase in production/manufacturing/resale costs, and/or require the use of permanently installed inscribing and/or support mechanisms. In addition to an overall increase in production/manufacturing/resale costs, some of these permanently installed inscribing and/or support mechanisms also prevent the user from using the tape to generate the desired dimensions of the circle or arc. Said another way, the user is limited to only one particular dimension for the arc and/or the desired dimension for the arc in accurate.

Therefore, a need exists to overcome the problems with the prior art as discussed above.

SUMMARY OF THE INVENTION

The invention provides a tape measure device and attachment that permits users to manipulate or otherwise translate a tab on a tang so as to place the tab in a position to effectively and efficiently enter and remove a tool to score or cut drywall. The tab is also operable to be positioned such that the tang can be utilized as originally intended, without any spatial restrictions. Additionally, the tape measure attachment device can also be efficiently and effectively utilized in conjunction with one or more apertures formed on a tape of the tape measure to inscribe a circle or arc on said drywall or other medium.

With the foregoing and other objects in view, there is provided, in accordance with the invention, a tape measure attachment device is disclosed that may be selectively couplable to a tape measure for measuring and cutting a piece of material and includes a securing portion shaped to receive a portion of a tape member of a tape measure, an extension member coupled to the securing portion to form a joint and disposed at a substantially perpendicular orientation to the securing portion, wherein the extension member having an outer face, and a tab coupled to the extension member. The tab has an upper face defining at least one aperture, a first position along a tab translation path with the tab disposed at a substantially perpendicular orientation to the extension member and extending in a direction outwardly away from the outer face of the extension member, and a second position along a tab translation path with the tab disposed at a substantially parallel orientation to the extension member.

In accordance with another feature, an embodiment of the present invention includes a tool placement zone defined by the outer face of the extension member and the upper face of the tab, wherein the tool placement zone terminates at the joint and is free of any obstructions so as to allow a tool to be removably placed in the tool placement zone and inserted into the at least one aperture.

In accordance with yet another feature, an embodiment of the present invention includes the outer face of the extension member having a tab recess shaped and sized to correspond to a shape and a size of the tab.

In accordance with an additional feature, an embodiment of the present invention includes the second position along the tab translation path having the tab disposed within the tab recess. In other embodiments, the second position includes the tab disposed within the tab recess, wherein the outer face of the extension member, extending from the joint to a terminal lower edge, is substantially planar.

In accordance with a further feature of the present invention, the tab translation path is either rotational or linear.

In accordance with yet another feature of the present invention, the extension member includes peripheral outer edges defining the outer face with an outer face area and the tab includes peripheral outer edges defining an upper face with an upper face area of a dimension less than a dimension of the outer face area.

In accordance with a further feature, another embodiment of the present invention includes the securing portion having a first securing member and a second securing member hingedly coupled to the first securing member, wherein the first securing member has a male engagement member adapted to removably couple with a complementary female engagement member disposed on the second securing member.

In accordance with another feature, an embodiment of the present invention includes a first extended position along an attachment device translation path including the tape measure attachment device disposed a distance away from a tape measuring housing and a second retracted position along the attachment device translation path including the tape measure attachment device at least partially disposed within the tape measure housing.

In accordance with a further feature of the present invention, the tab is coupled to the extension member at a terminal end of the extension member.

In accordance with an additional feature, the at least one aperture is elongated.

In accordance with a further feature, the securing portion includes a terminal end and the extension member is coupled to the securing portion at the terminal end of the securing portion.

In accordance with the present invention and in combination with a tape measure having a housing and a tape member having a plurality of indicia corresponding to incremental distances disposed along a measuring tape length, wherein the tape member is operably configured to be selectively extendable from the housing, and the improvement includes a tang coupled to a free end of the tape member and has (1) an extension member disposed at a substantially perpendicular orientation to a longitudinal direction of the tape member, (2) a tab coupled to the extension member and having an upper face defining at least one aperture, and (3) a tool placement zone defined by an outer face of the extension member and the upper face of the tab, wherein the tool placement zone is free of any obstructions so as to allow a tool to be removably placed in the tool placement zone and inserted into the at least one elongated aperture. The improvement also includes the tape member having a plurality of apertures respectively corresponding with the plurality of indicia of the tape member for providing a user the ability to inscribe circles and arcs.

In accordance with another feature, the plurality of apertures are respectively aligned with the plurality of indicia of the tape member.

In accordance with the present invention and in combination with a tape measure having a housing and a tape member having a plurality of indicia corresponding to incremental distances disposed along a measuring tape length, wherein the tape member operably configured to be selectively extendable from the housing, another improvement is disclosed that includes a tang coupled to a free end of the tape member and having (1) an extension member disposed at a substantially perpendicular orientation to a longitudinal direction of the tape member and (2) a tab coupled to the extension member. The tab has an upper face defining at least one aperture, a first position along a tab translation path with the tab disposed at a substantially perpendicular orientation to the extension member and extending in a direction outwardly away from the outer face of the extension member, and a second position along a tab translation path with the tab disposed at an orientation with the tab not extending in a direction outwardly away from the outer face of the extension member. The tang also includes a tool placement zone defined by an outer face of the extension member and the upper face of the tab, wherein the tool placement zone free of any obstructions so as to allow a tool to be removably placed in the tool placement zone and inserted into the at least one elongated aperture.

In accordance with another feature, the extension member is flush against the tape measure housing when the tang is in the second retracted position.

Although the invention is illustrated and described herein as embodied in a tape measure device and attachment for measuring and cutting a piece of material, e.g., drywall, it is, nevertheless, not intended to be limited to the details shown because various modifications and structural changes may be made therein without departing from the spirit of the invention and within the scope and range of equivalents of the claims. Additionally, well-known elements of exemplary embodiments of the invention will not be described in detail or will be omitted so as not to obscure the relevant details of the invention.

Other features that are considered as characteristic for the invention are set forth in the appended claims. As required, detailed embodiments of the present invention are disclosed herein; however, it is to be understood that the disclosed embodiments are merely exemplary of the invention, which can be embodied in various forms. Therefore, specific structural and functional details disclosed herein are not to be interpreted as limiting, but merely as a basis for the claims and as a representative basis for teaching one of ordinary skill in the art to variously employ the present invention in virtually any appropriately detailed structure. Further, the terms and phrases used herein are not intended to be limiting; but rather, to provide an understandable description of the invention. While the specification concludes with claims defining the features of the invention that are regarded as novel, it is believed that the invention will be better understood from a consideration of the following description in conjunction with the drawing figures, in which like reference numerals are carried forward. The figures of the drawings are not drawn to scale.

Before the present invention is disclosed and described, it is to be understood that the terminology used herein is for the purpose of describing particular embodiments only and is not intended to be limiting. The terms "a" or "an," as used herein, are defined as one or more than one. The term "plurality," as used herein, is defined as two or more than two. The term "another," as used herein, is defined as at least a second or more. The terms "including" and/or "having," as used herein, are defined as comprising (i.e., open language). The term "coupled," as used herein, is defined as connected, although not necessarily directly, and not necessarily mechanically. The term "providing" is defined herein in its broadest sense, e.g., bringing/coming into physical existence, making available, and/or supplying to someone or something, in whole or in multiple parts at once or over a period of time.

As used herein, the terms "about" or "approximately" apply to all numeric values, whether or not explicitly indicated. These terms generally refer to a range of numbers that one of skill in the art would consider equivalent to the recited values (i.e., having the same function or result). In many instances these terms may include numbers that are rounded to the nearest significant figure. In this document, the term "longitudinal" should be understood to mean in a direction corresponding to an elongated direction of a tape measure from an end that makes contact with a tape measure reel toward a tang of the tape measure.

BRIEF DESCRIPTION OF THE DRAWINGS

The accompanying figures, where like reference numerals refer to identical or functionally similar elements throughout the separate views and which together with the detailed description below are incorporated in and form part of the specification, serve to further illustrate various embodiments and explain various principles and advantages all in accordance with the present invention.

DETAILED DESCRIPTION

Figure 1:
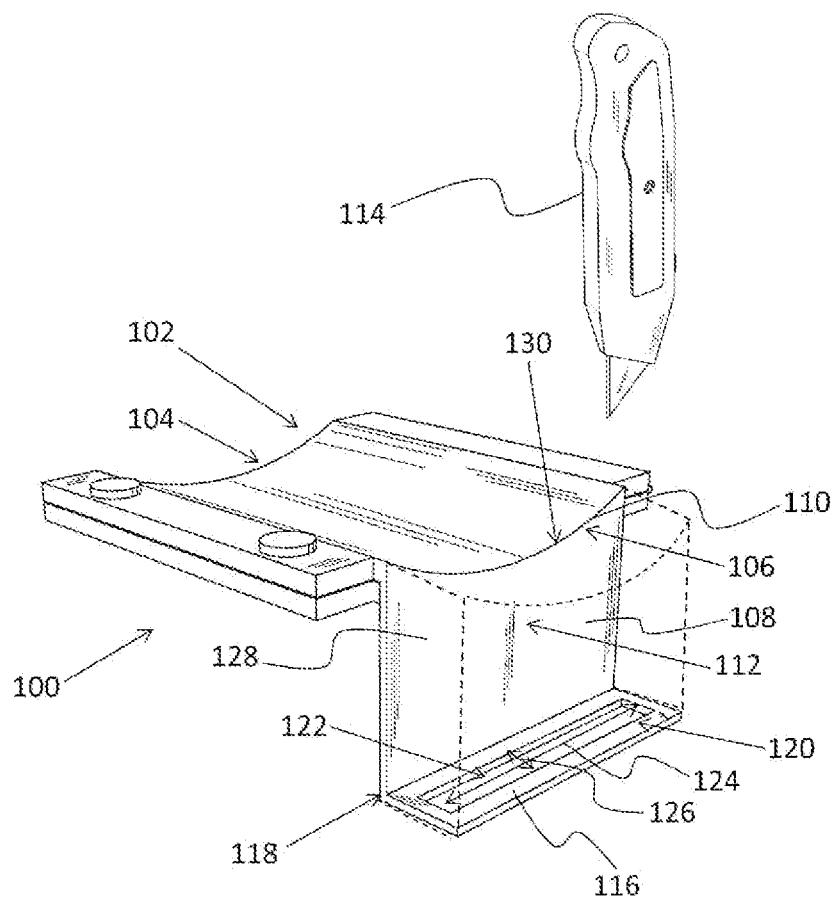
FIG. 1 is a perspective view of a tape measure attachment device and a tool, in accordance with the present invention.

While the specification concludes with claims defining the features of the invention that are regarded as novel, it is believed that the invention will be better understood from a consideration of the following description in conjunction with the drawing figures, in which like reference numerals are carried forward. It is to be understood that the disclosed embodiments are merely exemplary of the invention, which can be embodied in various forms.

The present invention provides a novel and efficient tape measure attachment device and method for measuring and cutting a piece of material, e.g., drywall. Embodiments of the invention provide the tape measure attachment device that is selectively couplable to a tape measure. As such, a user may utilize the tape measure alone or may utilize the tape measure having the tape measure attachment device coupled thereto for measuring and cutting drywall. Embodiments of the invention provide the tape measure attachment device defining a tab having an elongated aperture and a tool placement zone for receiving a tool, such as a utility knife or writing utensil, therein. Advantageously, the user may measure and cut the drywall while holding a housing of the tape measure in one hand and a free end of the tape measure and the tool in the other hand. The tool may be removed from the aperture in a single, uninterrupted, motion so as to provide the attachment device independent of nuts, bolts, or other fasteners, that may otherwise by used to secure the tool within the aperture.

Referring now to FIG. 1, one embodiment of the present invention is shown in a perspective view. FIG. 1 shows several advantageous features of the present invention, but, as will be described below, the invention can be provided in several shapes, sizes, combinations of features and components, and varying numbers and functions of the components. The first example of a tape measure attachment device, i.e., attachment device 100, as shown in FIG. 1, includes a securing portion 102. In one embodiment, the securing portion 102 includes a first end 104 and a second end 106 opposite to the first end 104. With also brief reference to FIG. 4, the securing portion 102 is the portion of the attachment device 100 that selectively couples to a tape measure 400. In other embodiments, as described below, the securing portion 102 will be the "tang" that is typically used in standard tape measures. The attachment device 100, more specifically, the securing portion 102, is configured to substantially surround a tape member 402, i.e., flexible ruler, of the tape measure 400. The term substantially surround is defined herein as at least partially encircling or encapsulating the tape member 402.

In one embodiment, the attachment device 100 is made of an elastic material, e.g., rubber or a PVC-based polymer. As such, the attachment device 100 may conform to the shape, i.e., it may be deformable, of the tape measure 400 and return back to its static-state shape after its change in shape. In other embodiments, the attachment device 100 may be made of another type of material, e.g., metal or a rigid plastic.

Figure 2:
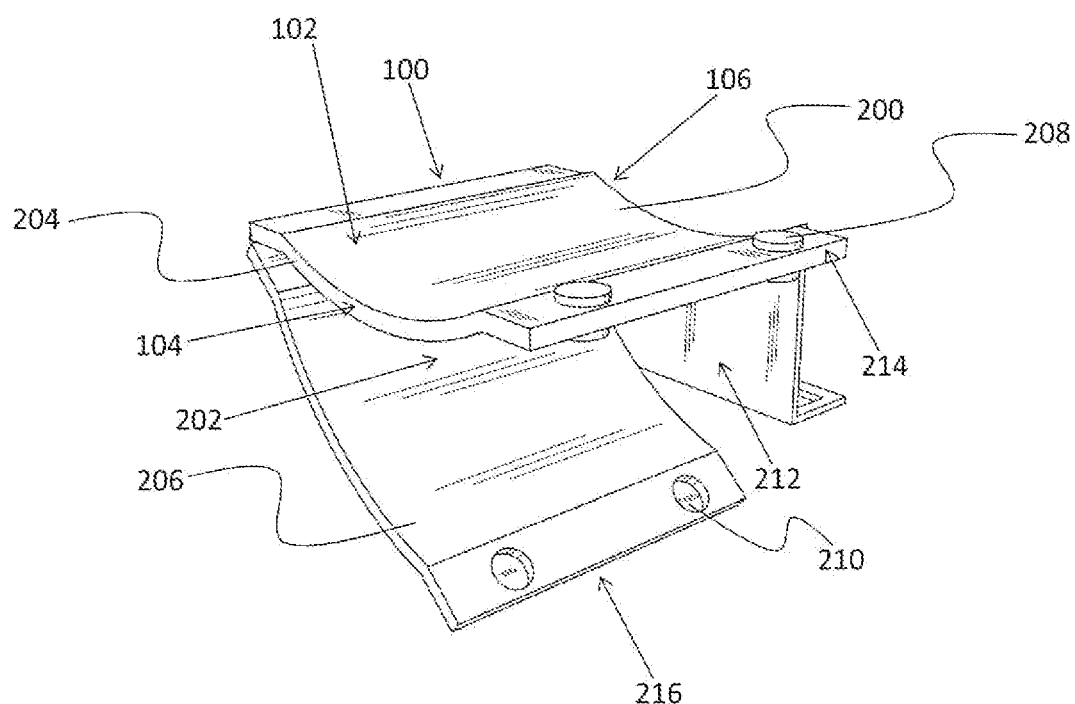
FIG. 2 is a right rear perspective view of the tape measure attachment device of FIG. 1 depicting a securing portion, in accordance with the present invention.
Figure 4:
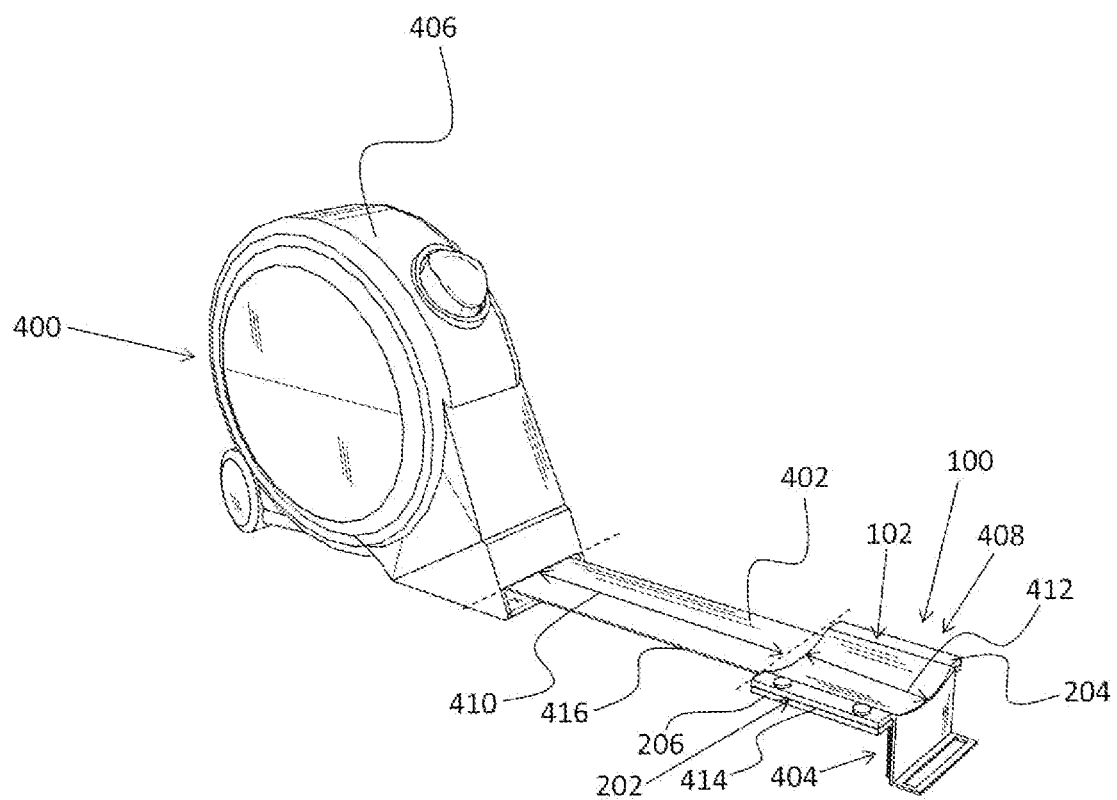
FIG. 4 is a perspective view of the tape measure attachment device of FIG. 1 coupled to a tape member and both in an extended position, in accordance with the present invention.

With reference now to FIGS. 2 and 4, in one embodiment, in order to couple the securing portion 102 to the tape member 402, the securing portion 102 includes a curvilinear body portion 200 to conform to the shape of most standard tape measures having a slight curvature. In other embodiments, the securing portion 102 may include a non-curvilinear body portion 200.

FIG. 2 depicts the securing portion 102 shaped to receive a portion of the tape member 402. More specifically, in one embodiment, the securing portion 102 defines a tape measure opening 202 spanning from the first end 104 of the securing portion 102 to the second end 106 of the securing portion 102. The tape measure opening 202 is sized and shaped to receive a portion of the tape member 402 within the opening 202. In one embodiment, the portion of the tape member 402 sized and shaped to fit within the opening may include the tang 404. In another embodiment, the portion of the tape member 402 includes the area within 1.0 to 2.0 inches of the tang 404. In other embodiments, the portion of the tape member 402 sized and shaped to fit within the opening 202 may be outside of this range. Generally speaking, the tang 404 is the hook on an end of the tape member 402 for aiding in measuring.

In one embodiment, the opening 202 is created by translating a first securing member 204 with respect to a second securing member 206, which is hingedly coupled thereto. In one embodiment, the first and second securing members 204, 206 may define the opening 202, i.e., a slit, sized and shaped to receive the portion of the tape member 402 therein. Said another way, a user may selectively close and open the securing portion 102 to secure the attachment device 100 to the tape member 402. Advantageously, such configuration allows a user to utilize the tape measure 400 with or without the attachment device 100 coupled thereto. With brief reference to FIG. 4, in one embodiment, the first securing member 204 and the second securing member 206 define the opening 202 having a height 414 substantially equal to a thickness 416 of the tape member 402 disposed within the opening 202. The term "substantially equal" is defined herein as +/−1/16 of an inch. The height 414 of the opening 202, in combination with the elastic material, assists in allowing the attachment device 100 to conform to the shape of the tape measure 400 and return back to its static-state shape after its change in shape.

Figure 3:
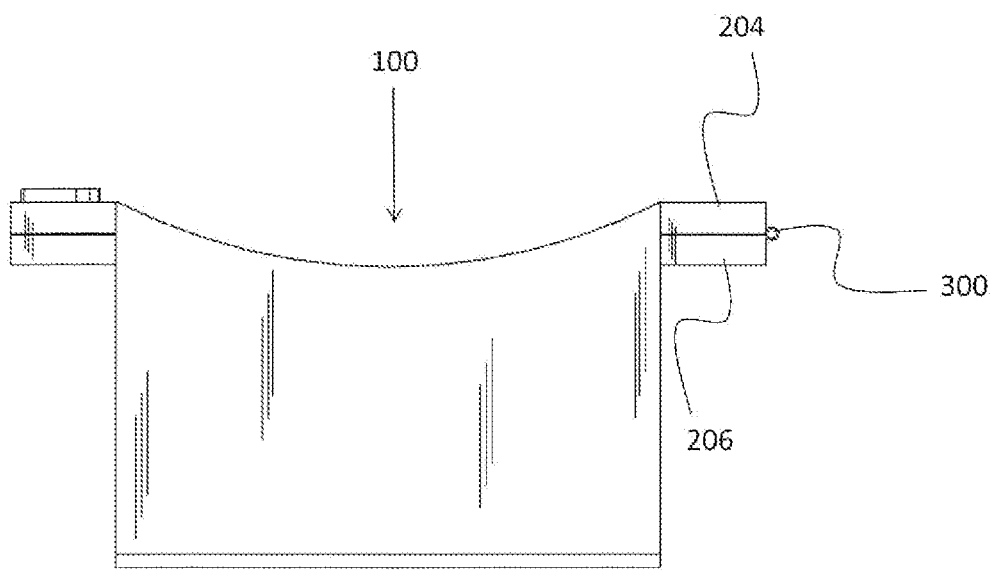
FIG. 3 is an elevational front view of the tape measure attachment device of FIG. 1 depicting a hinge coupling a first securing member to a second securing member.

With brief reference now to FIG. 3, depicting an elevational front view of the attachment device 100, a hinge 300 can be seen coupling the first securing member 204 to the second securing member 206. The hinge 300 may be a mechanical hinge, spring, coil, the material of the first and second securing members 204, 206, or another similar connection mechanism for holding together two parts such that one part can move relative to the other.

With reference again to FIG. 2, in one embodiment, in order to couple the distal ends 214, 216 of the first and second securing members 204, 206 to each other, the first securing member 204 includes a male engagement member 208 adapted to removably couple with a complimentary female engagement member 210 disposed on the second securing member 206. The male and female engagements members 208, 210 may together form a snap fastener. The male and female engagement members 208, 210 assist in maintaining the securing portion 102 in a stationary position to facilitate in preventing the attachment device 100 from sliding along the tape member 402 (FIG. 4). Such configuration is also beneficial in providing accurate measurements. It should also be noted that while the upper securing member 204 is referred to herein as the "first securing member," the upper securing member 204 may also be considered the second securing member.

In another embodiment, the first and second securing members 204, 206 may be coupled to each other through a clip, a hook and loop type fastener, or another type of fastener. In other embodiments, the securing portion 102 and the opening 202 may include a single securing member configured to couple to the tape member 402. For example, the securing portion 102 may include a pair of grooves on a bottom portion configured to slide over the tape member 402.

With reference back to FIG. 1, the attachment device 100 includes an extension member 108 coupled to the securing portion 102, more specifically, the second end 106 of the securing portion 102, of to form a joint 110. The extension member 108 is disposed at a substantially perpendicular orientation to the second end 106 of the securing portion 102. The term "substantially perpendicular" as used herein, is defined as 90° (+/−15°) of a referencing object or surface. In one embodiment, the second end 106 includes a terminal end 130. The extension member 108 may be coupled to the securing portion 102 at the terminal end 130. In other embodiments, the extension member 108 may be coupled within one to two centimeters of the terminal end 130 or another location.

In a preferred embodiment, the extension member 108, more specifically, a rear surface 212 (FIG. 2) of the extension member 108, is configured to be flush against the tang 404 (FIG. 4) in order to provide the user with a more precise measurement when utilizing the attachment device 100 to measure and cut a piece of material. Said another way, the distance between the extension member 108 and the tang 404 is void of any gaps so as to allow a precise alignment of the attachment device 100 with a predetermined reference point as measured by the user for placement of the piece of material. The "piece of material" is defined herein as drywall, particle board, and the like, which includes a flat planar surface. The extension member 108 includes an outer face 112, i.e., outer surface, located opposite from the rear surface 212 (FIG. 2) of the extension member 108 that is flush against the tang 404 (FIG. 4).

In order to insert a tool 114 into the attachment device 100 in order to score or measure the piece of material, the attachment device 100 has a tab 116 coupled to and disposed at a substantially perpendicular orientation to the extension member 108. In one embodiment, the tab 116 is coupled to the extension member 108 at a terminal end 118 of the extension member 108. In other embodiments, the tab 116 may be coupled to the extension member 108 within approximately one to two centimeters of the terminal end 118 or at another location. The tab 116 may be made, without limitation, of the same material as the rest of the device 100, but should be of a material durable enough to support the weight of the tool 114 when coupled to the device 100.

In one embodiment, the tab 116 includes an upper face 120, i.e., upper surface, defining at least one elongated aperture 122 for receiving the tool 114 through the aperture 122. The aperture 122 is sized such that a distal end of the tool 114 fits securely within the aperture 122 without the risk of falling out when being held by the user. The term "elongated" is defined herein as having a length 124 greater than the width 126. It is preferred however, that the elongated aperture be of a length 124 at least twice as long as the width 126. The length 124 and the width 126 may vary according to the dimensions of the tool. In other embodiments, the aperture 122 may include the length 124 that is less than twice as long as the width 126.

In a preferred embodiment, the tool 114 is a utility knife or a writing utensil. The term "tool" as used herein, is not meant to be limiting but rather is defined in its broadest sense and includes, but is not limited to, a utility knife having a standard razor blade, a double-ended utility blade or a segmented blade, a pencil, or any other tool commonly used for measuring and cutting drywall. In other embodiments, the tool 114 may be another type of tool commonly used with construction materials, and more particularly, tools utilized for measuring and cutting drywall.

In one embodiment, the tab 116 forms part of a tool placement zone 128. More specifically, in one embodiment, the tool placement zone 128 is defined by the outer face 112 of the extension member 108 and the upper face 120 of the tab 116. In one embodiment, the tool placement zone 128 terminates at the joint 110. In other embodiments, the tool placement zone 128 may extend beyond the location of the joint 110 but within one to two inches of the joint 110, depending on the overall length of the tool 114.

FIG. 1 depicts the tool placement zone 128 free of any obstructions so as to allow the tool 114 to be removably placed in the tool placement zone 128 and inserted into the aperture 122. Said differently, the tool placement zone 128 is a volume defined by the edges of the faces 112, 120 of the extension member 108 and tab 116, and terminates based on the shape of the terminal end 130 of the securing portion 102. Advantageously, the user may utilize the tape measure as normally intended and may also couple the attachment device 100 to the tape measure 400 when desired to measure and cut the drywall.

With reference now to FIG. 4, the attachment device 100 can be seen in combination with, i.e., as an improvement to, the tape measure 400 having a housing 406 and the tape member 402 which extends from and retracts into the housing 406. The tape member 402 may be made of cloth, plastic, fiber glass, or metal as is generally known to those of ordinary skill the art. The tape member 402 includes an attachment end coupled to a reel (not shown) disposed within the housing 406, as is commonly found in a standard tape measure. The opposing end of the tape member 402 includes a free end 408 that selectively extends from the housing. The tang 404 can be seen coupled to the free end 408 of the tape member 402.

FIG. 4 depicts the tape measure 400 having a first extended position along an attachment device including the attachment device 100 disposed a distance 410 from the housing 406. The distance may vary, i.e., increase and/or decrease, in accordance with the predetermined reference point measured by the user when measuring the dimensions for placement of the drywall. The distance 410 may also vary depending on an overall length 412 of the securing portion 102 extending from the free end 408 of the tape member 402 towards the housing 406 disposed the distance 410 from the free end 408.

Advantageously, the attachment device 100 can remain coupled to the tape measure 400 during the measuring process, thereby reducing the risk of the user misplacing the attachment device 100. As an added advantage, in use, the present attachment device 100 is generally more efficient and convenient than known methods utilizing similar devices, as the user does not have to spend valuable time assembling multiple components prior to using and/or storing the attachment device 100.

Figure 5:
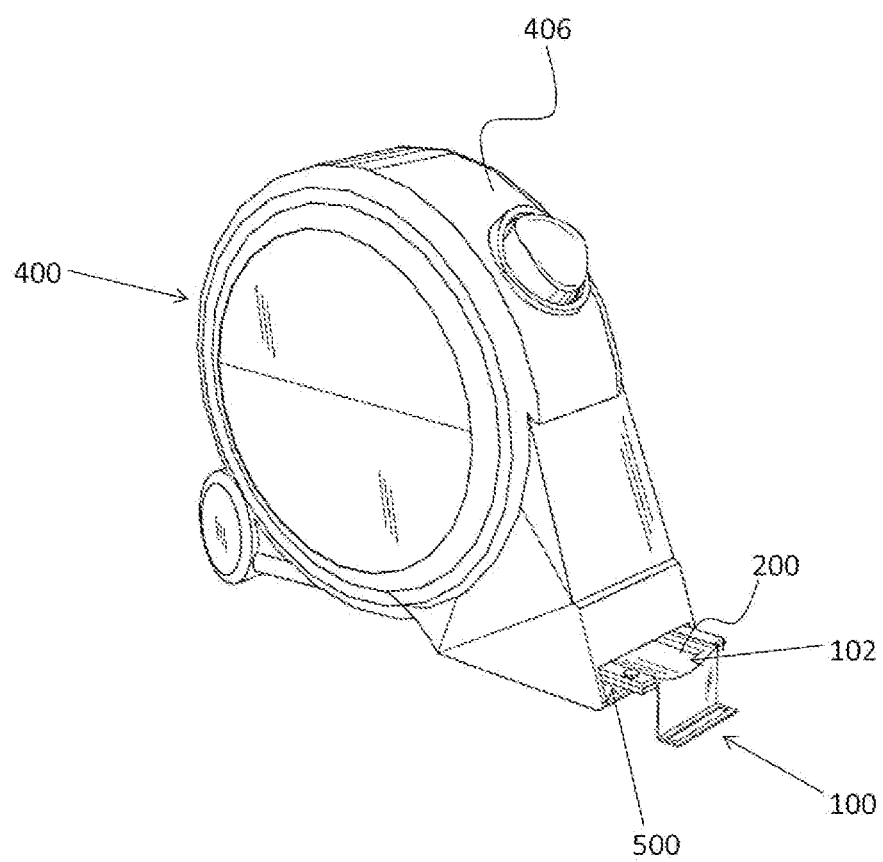
FIG. 5 a perspective view of the tape measure attachment device of FIG. 1 showing the tape measure attachment device at least partially disposed within a tape measure housing, in accordance with the present invention.

With reference now to FIG. 5, the attachment device 100 is depicted having a retracted position, i.e., storage position, along the attachment device translation path. In one embodiment, the retracted position includes the attachment device 100, more specifically, the securing portion 102, at least partially disposed within the housing 406 through a housing aperture 500 defined by the housing 406. Said another way, approximately 40% to 60% of the securing portion 102 is disposed within the housing 406 in the retracted position. In another embodiment, the area of the securing portion 102 disposed within the housing 406 may be outside of this range. In other embodiments, the securing portion 102 may be completely disposed within the housing 406. In order to facilitate in the body portion 200 being capable of at least partially receding into the housing 406, the total thickness of the body portion 200 is less than approximately ⅛"-¼" in one embodiment.

FIG. 5 depicts the body portion 200 of the securing portion 102 being curvilinear to allow the body portion 200 to fit within the housing aperture 500. In other embodiments, the body portion 200 may be of a non-curvilinear shape that still allows the body portion 200 to fit at least partially within the housing aperture 500. Advantageously, the attachment device 100 can remain coupled to the tape measure 400 during storage, thereby reducing the risk of the user misplacing the attachment device 100. As an added advantage, the present method is generally more efficient and convenient than known methods utilizing similar devices, as the user does not have to spend valuable time assembling multiple components when converting the tape measurement attachment device from the extended position (FIG. 4) to the retracted position (FIG. 5).

Figure 6:
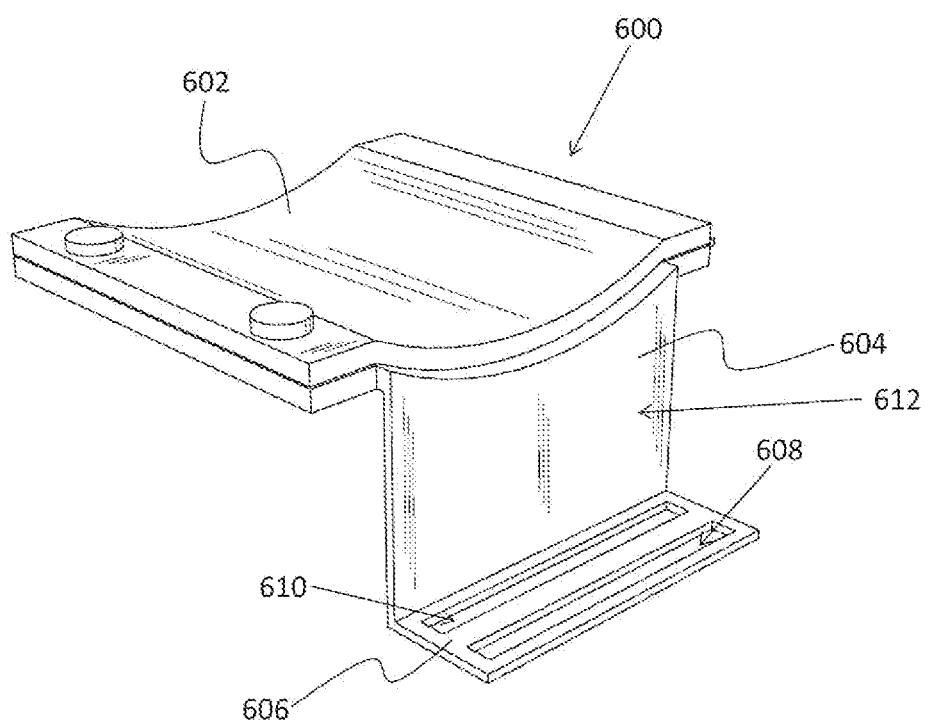
FIG. 6 is a perspective view of another exemplary embodiment of a tape measure attachment device depicting a tab defining two elongated apertures, in accordance with the present invention.

Referring now to FIG. 6, another embodiment of a tape measure attachment device 600, i.e., attachment device 600, is depicted in a perspective view. FIG. 6 depicts a securing portion 602 coupled to an extension member 604. A tab 606 is coupled to the extension member 604 at a substantially perpendicular angle with respect to the extension member 604. Similar to the tab 116 of FIG. 1, the tab 606 defines an elongated aperture 608 for receiving the tool 114 (FIG. 1) within the aperture. The tab 606 is depicted also defining another elongated aperture 610 for receiving the tang 404 of the tape measure 400 (FIG. 4) therein. Advantageously, the aperture 610 is sized and shaped to receive the tang 404 in a secure manner, such that the tang 404 remains in a stationary position. A rear surface (not shown) of the tang is adjacent an upper face 612, i.e., upper surface, of the extension member 604. Advantageously, in use, a terminal end of the tang 404 (FIG. 4) can be aligned with a terminal end of the tool 114 to provide the user with an accurate device for measuring and cutting the piece of material. More specifically, the terminal end of the tang 404 and the terminal end of the tool 114 may be placed in an overlapping relationship with the piece of material and aligned parallel to the predetermined reference point for scoring the drywall.

Figure 7:
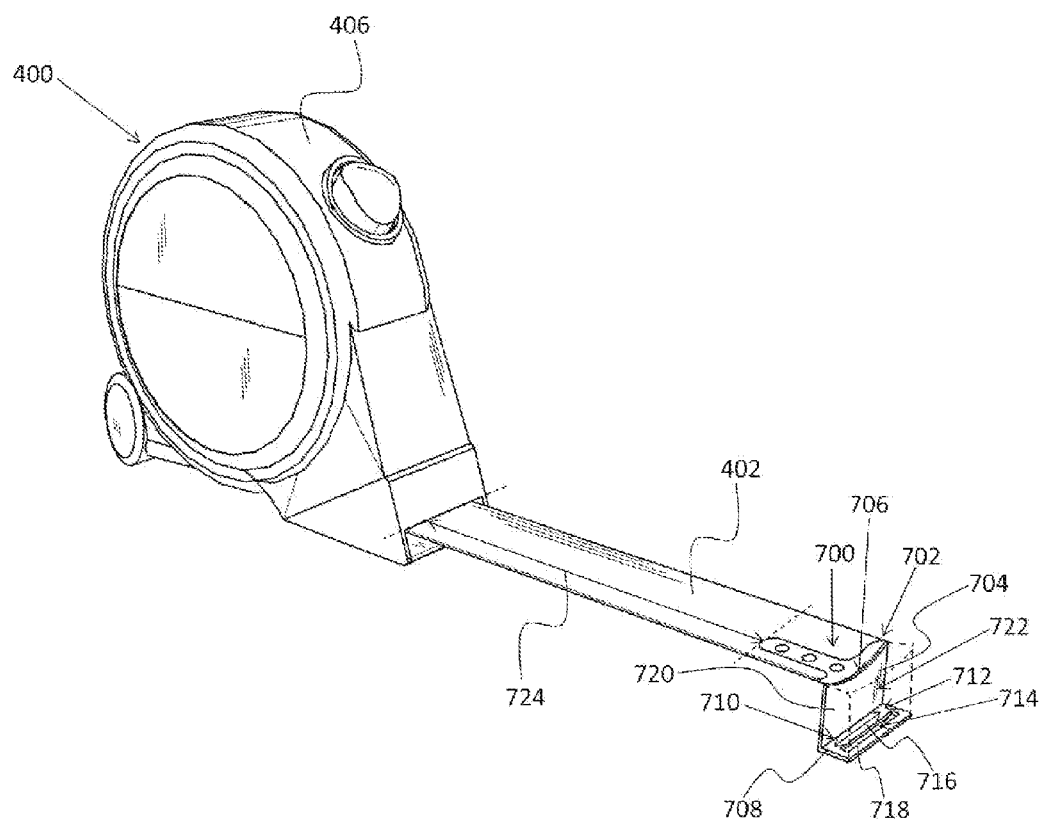
FIG. 7 is a perspective view of another exemplary embodiment of a tang and the tape member of the tape measure and both in an extended position, in accordance with the present invention.

With reference now to FIG. 7, another embodiment of a tang 700 is shown as an improvement to a standard tape measure, such as the tape measure 400 having the tape member 402 temporarily stored within the housing 406. Said another way, the tape member 402 is operably configured to be selectively extendable from the housing 406. In one embodiment, the tang 700 may be the securing portion, as briefly referenced above. The tang 700 includes a distal end 702 and an extension member 704 disposed at a substantially perpendicular orientation to a longitudinal direction of the tape member 402 as shown in FIG. 7. In one embodiment, the extension member 704 is coupled to a terminal end 706 of the tape member 402, wherein the terminal end 706 is disposed at the distal end 702 of the tape member 402. In other embodiments, the extension member 704 may be coupled within 1-2 cms of the terminal end 706 or another location.

In order to insert the tool 114 into the tang 700 to score the drywall, the tang 700 includes a tab 708 coupled to and disposed at the substantially perpendicular orientation to the extension member 704. The tab 708 will be described generally, as the tab 708 includes analogous or nearly analogous features as the tab 116 describe above with respect to FIG. 1. In one embodiment, the tab 708 is coupled to the extension member 704 at a terminal end 710 of the extension member 704. In other embodiments, the extension member 704 may be coupled within 1-2 cms of the terminal end 710 or another location.

In a preferred embodiment, the tab 708 is coupled to the tang 700 to form a single unit, providing an improvement to the tape measure 400. Advantageously, the single unit configuration eliminates the need for the assembling of bolts, nuts, etc., as securing mechanisms to couple the tab 708 to the extension member 704. As an added advantage, such configuration eliminates the need for the user to search for such securing mechanisms, within for example a tool box, prior to assembly. In other embodiments, the tab 708 may be selectively coupled to the extension member 704 as described above.

The tab 708 includes an upper face 712 defining at least one elongated aperture 714. The term "elongated" is defined herein as having a length 716 greater than the width 718. It is preferred however, that the aperture 714 be of a length 716 at least twice as long as the width 718. The length 716 and the width 718 may vary according to the dimensions of the tool. In other embodiments, the aperture 714 may include the length 716 that is less than twice as long as the width 718. The aperture 714 is sized such that a distal end of the tool 114 fits securely within the aperture 714 without the risk of falling out when being held by the user.

FIG. 7 depicts the tang 700 having a tool placement zone 720. The tool placement zone 720 will be described generally, as the tool placement zone 720 includes analogous or nearly analogous features as the tool placement zone 128 described above with respect to FIG. 1. The tool placement zone 720 may be defined by an outer face 722 of the extension member 704 and the upper face 712 of the tab 708. Said differently, the tool placement zone is a volume defined by the edges of the faces 722,712 of the extension member 704 and the tab 708, and terminates based on the shape of the terminal end 706 of the tang 700. The tool placement zone 720 is free of any obstructions so as to allow the tool 114 to be removably placed in the tool placement zone 720 and inserted into the aperture 714.

FIG. 7 depicts the tang 700 having a first extended position along the tape member 402 translation path. The extended position includes the tang 700 disposed a distance 724 away from the tape measuring housing 406. The distance may vary, i.e., increase and/or decrease, in accordance with the predetermined reference point measured by the user when measuring the dimensions for placement of the piece of material.

Figure 8:
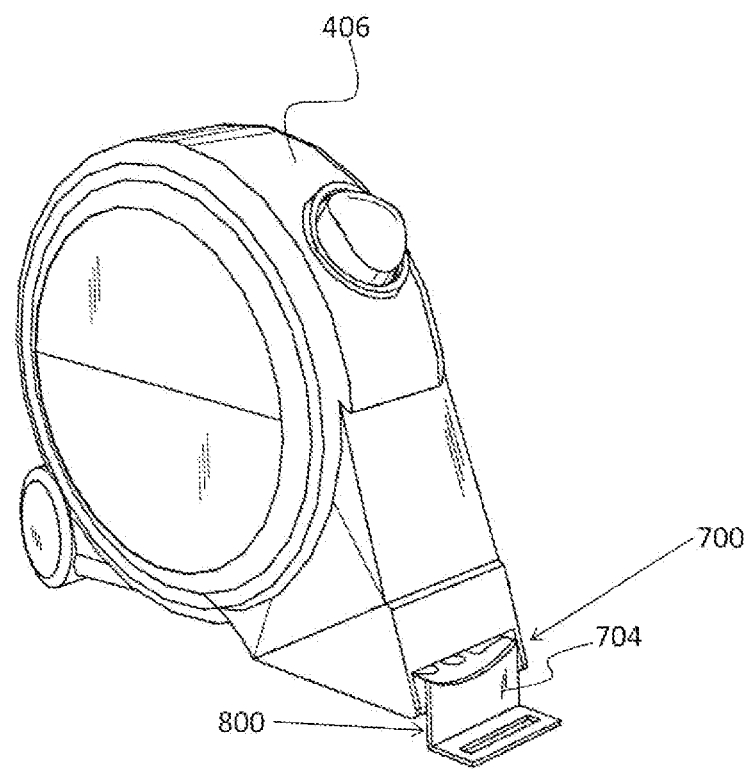
FIG. 8 is a perspective view of the tang of FIG. 7 at least partially disposed within the tape measure housing, in accordance with the present invention.

With reference now to FIG. 8, the tang 700 includes a second retracted position along the tape member 402 translation path. The retracted position, i.e., storage position, includes the tang 700 at least partially disposed within the tape measure housing 406. In the retracted position, the extension member 704, more specifically a rear surface 800 of the extension member 704, is flush against the tape measure housing 406 in order to provide the user with a compact storage position.

Figure 9:
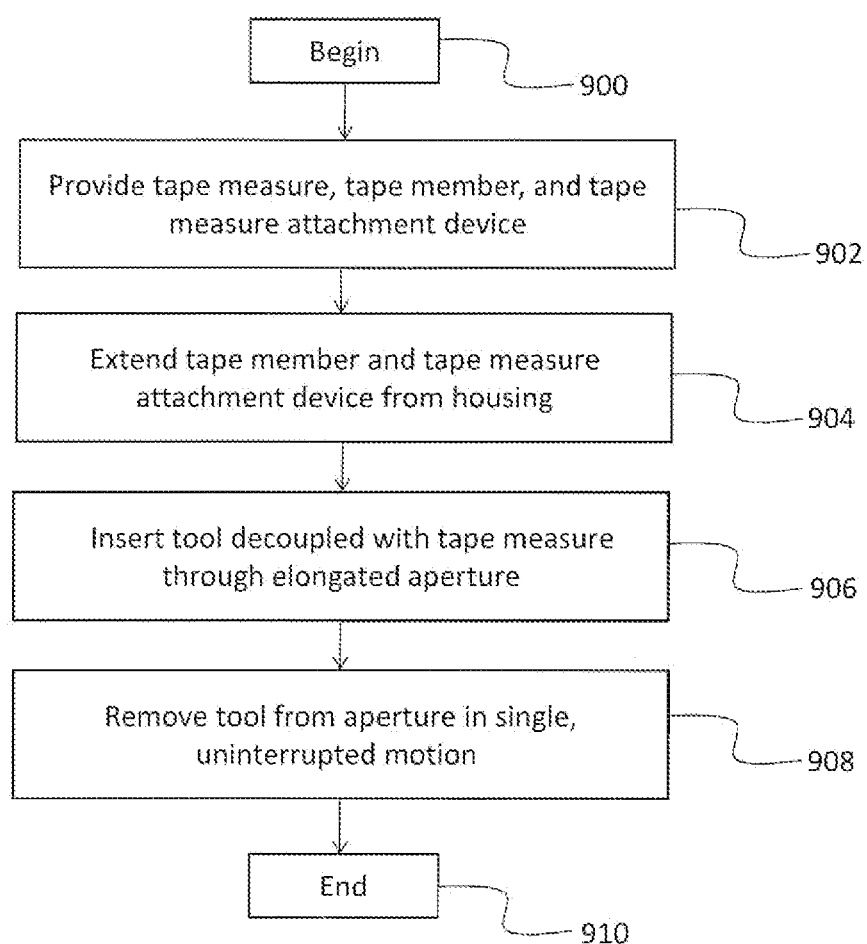
FIG. 9 is a flow diagram for illustrating a process of measuring and cutting a piece of material using the tape measure attachment device of FIGS. 1 and 7.

Referring now primarily to FIG. 9, in conjunction with FIGS. 1, 2, and 4, there is provided a method of measuring and cutting the piece of material. In one embodiment, the method includes, without limitation, utilizing a tape measure attachment device, such as the tape measure attachment device 100 having the securing portion 102, described herein. In other embodiments, the method includes utilizing a tang, e.g., the tang 700, as the securing portion 102. The steps delineated in the exemplary process-flow diagram of FIG. 9 are merely exemplary of the preferred order of measuring and cutting the piece of material and said steps may be carried out in another order, with or without additional steps included therein.

In said process, the method begins at step 900 and proceeds to step 902, where a tape measure, a tape member, and a tape measure attachment device, such as the tape measure 400, the tape member 402, and the attachment device 100 of FIG. 1, are provided, e.g., brought into physical existence. The tape measurement attachment device 100 preferably, but not necessarily, includes the securing portion 102, the extension member 108, the tab 116, and the tool placement zone 128, as described above. In other embodiments, the securing portion 102 will be the "tang" that is typically used in standard tape measures, or alternatively, the securing portion 102 is the tang 700.

The securing portion 102 may be selectively coupled to the tape member 402, as discussed above with respect to FIG. 4. More specifically, in order to couple the securing portion 102 to the tape member 402, the securing portion 102 may define a tape measure opening 202 sized and shaped to receive a portion of the tape member 402 within the opening 202, e.g., the portion of the tape member 402 adjacent to a tang 404 of the tape measure 400.

The securing portion 102 may, but does not necessary have to, include a first securing member 204 and a second securing member 206. The present method may include coupling a male engagement member 208 disposed on the first securing member 204 to a complimentary female engagement member 210 disposed on the second securing member 206. In such configuration, the first and second securing members 204, 206 substantially surround the tape member 402 to secure the securing portion 102 in a relatively stationary or stationary position with respect to the tape member 402.

In one embodiment, in order to provide accurate measurements, it is preferable, but not necessary, that the extension member 108 is flush against the tang 404. With brief reference to FIG. 6, in one embodiment, the tang 404 may be placed within the aperture 610 defined by the tab 606, such that a rear surface of the tang 404 is flush against the extension member 108.

The process proceeds to step 904 where the tape member 402 and the attachment device 100 are extended from the housing 406 to place the tab 116 in an overlapping relationship with the piece of material. More specifically, the tab 116 is aligned with a predetermined reference point on the piece of material, as measured by the user for placement of the piece of material. In such configuration, the tape measure 400 is an extended position including the tape member 402 disposed a distance 410 from the housing 406. Naturally, the distance may vary, depending on the predetermined reference point on the piece of material, as measured by the user.

In step 906, a tool, such as the tool 114, is inserted through the aperture 122 to contact the piece of material. The tool 114 is decoupled with the tape measure 400. Said differently, the tool 114 is a separate unit from the tape measure 400. Advantageously, the tape measure 400 can be utilized as intended, without the tool 114 being permanently coupled thereto. As an added advantage, the tape measure 400 can be stored independently of the tool 114. The term "tool" as used herein, is not meant to be limiting but rather is defined in its broadest sense and includes, but is not limited to, a utility knife having a standard razor blade, a double-ended utility blade or a segmented blade, a pencil, or any other tool commonly used for measuring and cutting the piece of material.

In use, the user may hold the housing 406 in one hand and the attachment device 100 having the tool 114 in the alternate hand. The user may slide both hands in a vertical direction along the piece of material to cut the piece of material. The user may also choose to trace a vertical measurement line along the piece of material, prior to cutting the material. When cutting the piece of material, it is preferred that the user only cut through only a portion of the material, as opposed to completely cutting through the material, as is commonly understood by those of ordinary skill in the art. Once the material has been cut, the user may turn over the piece of material and break apart, i.e., remove the portion that will be discarded by the user.

In step 908, the tool 114 is removed from the aperture 122 in a single, uninterrupted, motion. More specifically, the tool 114 may be easily and conveniently removed without the user having to remove any nuts, bolts, or other securing mechanisms that may otherwise be utilized to secure the tool 114 within the aperture 122.

Following removal of the tool 114 from the aperture 122, the tape member 402 and the attachment device 100 may be transitioned to a retracted position including the tape member 402 and the attachment device 100, more specifically, the securing portion 102, at least partially recessed within the housing 406. In embodiments having the tang 700 as the securing portion 102, at least a portion of the tang 700 may be recessed within the housing 406. Advantageously, the retracted position provides the user with a convenient storage position. The process ends at step 910.

Figure 10:
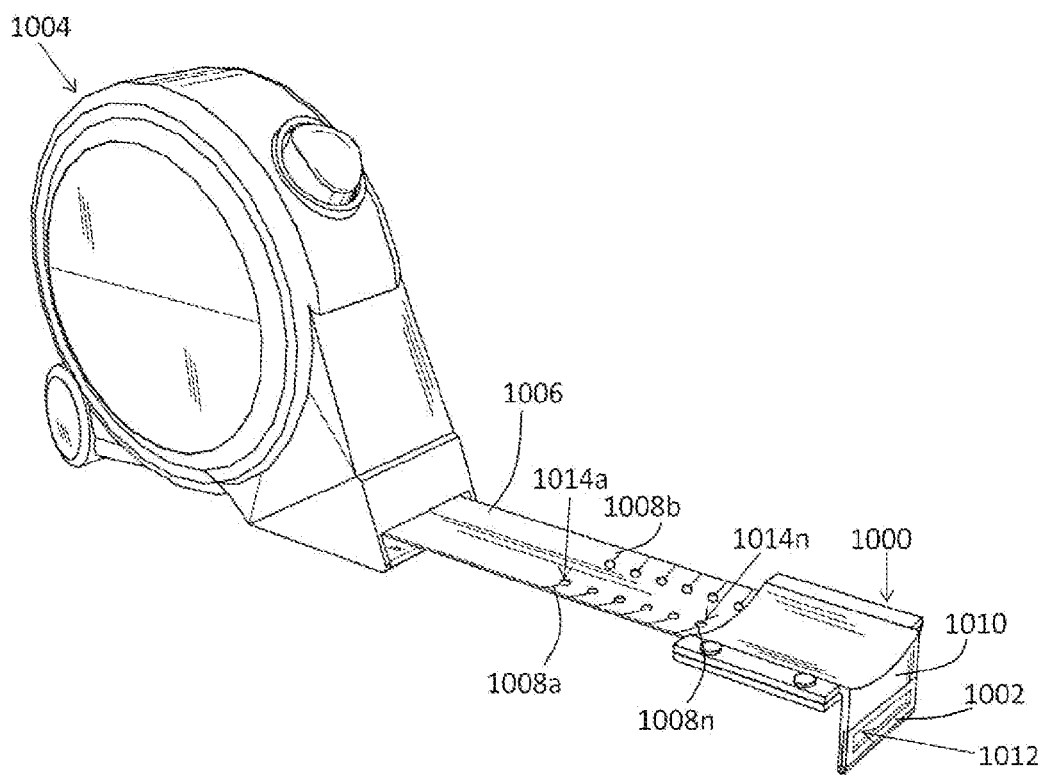
FIG. 10 is a perspective view of a tape measure device with an another embodiment of attachment coupled thereto.
Figure 11:
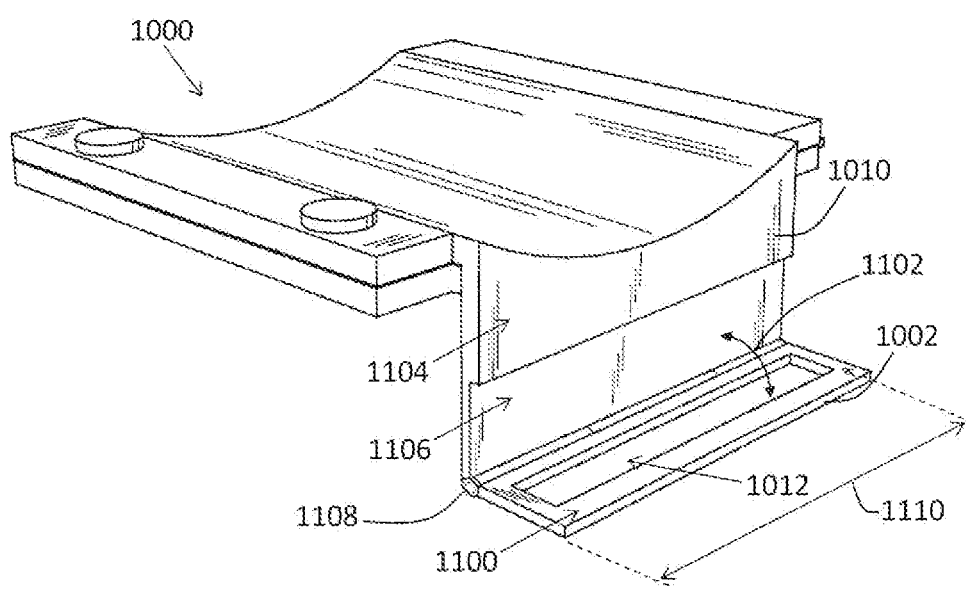
FIG. 11 is close-up view of the attachment of FIG. 10.

With reference now to FIGS. 10-11 another embodiment of a tape measure device and attachment for measuring and cutting drywall is illustrated from perspective views. More specifically, a tape measure attachment device 1000 is shown in FIGS. 10-11 that has many above-described features, but also includes a tab 1002 that beneficially translates. As such, in addition to the user being able to effectively and efficiently measure and/or score drywall, the user can also use the tang of the tape measure 1004 as intended. The device 1000 can also be effectuated by incorporating its functionality into a standard tang 700 (as depicted in FIG. 7). As appreciated by those of skill in the art, the tape member 1006 of the tape measure 1004 has a plurality of indicia 1008a-n (wherein "n" corresponds to any number of indicia greater than 1) corresponding to incremental distances disposed along a measuring tape length 724 (as represented in FIG. 7). The indicia 1008a-n is efficacious for determining a length or distance and may be represented as a multiplicity of linear marking having associated distances in Metric or English measuring units. In other embodiments, the indicia 1008a-n may be recesses, notches, or other indicia.

Advantageously, the tab 1002, which is coupled to the extension member 1010, has an upper face 1100 defining at least one aperture 1012, which is preferably, not necessarily, elongated so as to allow a tool entry and egress to access the drywall. To provide the user increased functionality and use of the tape measure 1004, the tab 1002 has a first position (shown in FIG. 11) and second position (shown in FIG. 10) along a tab translation path (exemplified by arrow 1102). The first position includes the tab 1002 disposed at a substantially perpendicular orientation to the extension member 1010 and extending in a direction away from the outer face 1104 of the extension member 1010. The second position includes the tab 1002 disposed at a substantially parallel orientation, i.e., within +/−15° of being parallel, to the extension member 1010 so the user may employ the tang of the tape measure as originally intended. A tool placement zone free of any obstructions, as described above, may also be utilized to allow a tool to be removably placed in the tool placement zone and inserted into the at least one aperture 1012.

In one embodiment, the tab translation path 1102 is of a circular, or rotational, path accomplished with a hinge or other hinge-like connection 1108 which may be employed by a separate component or by a material connection between the tab 1002 and extension member 1010. In other embodiments, the tab translation path 1102 is of linear or straight path accomplished with the tab 1002 having a telescopic connection with the extension member 1010. The extension member 1010 may also include a tab recess 1106 shaped and sized to correspond to a shape and a size of the tab 1002. For example, should the area defined by the perimeter edges of a rectangular tab 1002 be approximately 0.5 in$^2$, then the recess 1106 would also be of a rectangular shape and would have a recess 1106 that is approximately equal to, or slightly greater than, 0.5 in$^2$. The recess 1106 would also be of a depth sufficient to permit the thickness of the tab 1002 to be either partially or fully disposed (i.e., so the outer face 1104 is substantially planar as shown in FIG. 10) within the tab recess 1106. In further embodiments, the extension member 1010 includes peripheral outer edges defining the outer face 1104 with an outer face area, and the tab 1002 includes peripheral outer edges defining an upper face 1100 with an upper face area, wherein the outer face area is of a dimension less than a dimension of the outer face area. Said differently, the tab 1002 is sized to be smaller than the size of the extension member 1010 to provide a more efficient design providing less spatial restrictions for the user when the device 1000 is in use. Said even further, even though the tab 1002 is shown at the distal end 1110 of the extension member 1010 and being of width (represented with arrow 1110) equal to the width of the extension member 1010, it shall be construed to be so limited. In other embodiments, the tab 1002 may disposed centrally on the outer face 1104 or other location and may be of a different width 1012.

The tape member 1006 may also include a plurality of apertures 1014a-n that each, respectively, correspond with the plurality of indicia 1008a-n of the tape member 1006 as shown in FIG. 10. The plurality of apertures 1014a-n advantageously provides users the ability to inscribe, or write and/or carve, circles and arcs on the drywall or other medium the user desires. As also shown in FIG. 10, the plurality of apertures 1014a-n are respectively aligned with the plurality of indicia 1008a-n of the tape member 1006 to ensure the radius of the circle or radius of curvature of the arc is consistent with the user's specification. In other embodiments, should the aperture 1014 be offset from the distance between the extension member 1010, the plurality of apertures 1014a-n would also be offset accordingly, but yet still "correspond" to the plurality of indicia 1008a-n.

In one embodiment, there is one of the apertures 1014a-n disposed at every $^{1}/_{16}$ inch increment represented by the plurality of indicia 1008a-n. In other embodiments, the spacing of the apertures 1014a-n may vary, e.g., the spacing may be in 1 inch increments. As such, to utilize the device 1000 and tap measure 1004 to create, for example, a circle with a 6 inch diameter, the user would begin by extending the tape 1006 a length of approximately 3 inches. Next, the user will place a tool or other structure into the aperture 1014a-n corresponding to the 3 inch indicia representation in order to contact the drywall or other medium so as to act as a support. Next, the user will place a tool or other structure in the aperture 1012 to inscribe the perimeter of the circle. Of course those of skill in the art will appreciate that the method may be reversed, in that the user may use the aperture 1014 as the means to support and the aperture 1008 as the means to inscribe. Finally, to create the circle, the user would then, with or without locking the tape 1006, rotate or otherwise move the tab 1002 around the support created by the tool in the aperture 1008 to create an outline or recess representative of a 6 inch circle.

A tape measure attachment device has been described that has additional advantages of manipulating or otherwise translating a tab on the tang so as to place the tab in a position to effectively and efficiently enter and remove a tool to score or cut drywall, while the tab is also operable to be positioned such that the tang can be utilized as originally intended, without any spatial restrictions. Additionally, the tape measure attachment device can also be utilized in conjunction with one or more apertures formed on a tape of the tape measure to inscribe a circle or arc on said drywall or other medium.

What is claimed is:

1. A tape measure attachment device selectively couplable to a tape measure for measuring and cutting a piece of material, the tape measure attachment device comprising:
 a securing portion shaped to receive a portion of a tape member of a tape measure;
 an extension member coupled to the securing portion to form a joint and disposed at a substantially perpendicular orientation to the securing portion, the extension member having an outer face with an outer face area defined by peripheral outer edges of the outer face; and
 a tab coupled to the extension member and having:
  an upper face defining at least one aperture and having an upper face area defined by the peripheral outer edges of the upper face of the tab, the upper face area of the tab of a dimension less than a dimension of the outer face area of the extension member;
  a first position along a tab translation path with the tab disposed at a substantially perpendicular orientation to the extension member and extending in a direction outwardly away from the outer face of the extension member; and
  a second position along a tab translation path with the tab disposed at a substantially parallel orientation to the extension member.

2. The tape measure attachment device of claim 1, further comprising:
a tool placement zone defined by the outer face of the extension member and the upper face of the tab, the tool placement zone terminating at the joint and free of any obstructions so as to allow a tool to be removably placed in the tool placement zone and inserted into the at least one aperture.

3. The tape measure attachment device of claim 1, wherein the outer face of the extension member further comprises:
a tab recess shaped and sized to correspond to a shape and a size of the tab.

4. The tape measure attachment device of claim 3, wherein the second position along the tab translation path further comprises:
the tab disposed within the tab recess.

5. The tape measure attachment device of claim 4, wherein the second position along the tab translation path further comprises:
the tab disposed within the tab recess, wherein the outer face of the extension member, extending from the joint to a terminal lower edge, is substantially planar.

6. The tape measure attachment device of claim 1, wherein:
the tab translation path is of at least one of a rotational path and a linear path.

7. The tape measure attachment device of claim 1, wherein the securing portion further comprises:
a first securing member and a second securing member hingedly coupled to the first securing member, the first securing member having a male engagement member adapted to removably couple with a complementary female engagement member disposed on the second securing member.

8. The tape measure attachment device of claim 1, further comprising:
a first extended position along an attachment device translation path including the tape measure attachment device disposed a distance away from a tape measuring housing; and
a second retracted position along the attachment device translation path including the tape measure attachment device at least partially disposed within the tape measure housing.

9. The tape measure attachment device of claim 1, wherein:
the tab is coupled to the extension member at a terminal end of the extension member.

10. The tape measure attachment device of claim 1, wherein:
the at least one aperture is elongated.

11. The tape measure attachment device of claim 1, wherein:
the securing portion includes a terminal end; and
the extension member is coupled to the securing portion at the terminal end of the securing portion.

12. In combination with a tape measure having a housing and a tape member having a plurality of indicia corresponding to incremental distances disposed along a measuring tape length, the tape member operably configured to be selectively extendable from the housing, the improvement comprising:
a tang coupled to a free end of the tape member and having:
an extension member disposed at a substantially perpendicular orientation to a longitudinal direction of the tape member;
a tab coupled to the extension member and having an upper face defining at least one aperture, the upper face of the tab defined by the peripheral outer edges of the tab; and
a tool placement zone defined by an outer face of the extension member and the upper face of the tab, the tool placement zone free of any obstructions so as to allow a tool to be removably placed in the tool placement zone and inserted into the at least one elongated aperture,
wherein the tape member includes a plurality of apertures respectively corresponding with the plurality of indicia of the tape member for providing a use the ability to inscribe circles and arcs.

13. The improvement according to claim 12, wherein:
the plurality of apertures are respectively aligned with the plurality of indicia of the tape member.

14. In combination with a tape measure having a housing and a tape member having a plurality of indicia corresponding to incremental distances disposed along a measuring tape length, the tape member operably configured to be selectively extendable from the housing, the improvement comprising:
a tang coupled to a free end of the tape member and having:
an extension member disposed at a substantially perpendicular orientation to a longitudinal direction of the tape member and having an outer face;
a tab coupled to the terminal end of the extension member, the tab having:
an upper face defining at least one aperture;
a first position along a tab translation path with the tab disposed at a substantially perpendicular orientation to the extension member and extending in a direction outwardly away from the outer face of the extension member; and
a second position along a tab translation path with the tab disposed at an orientation with the tab not extending in a direction outwardly away from the outer face of the extension member; and
a tool placement zone defined by an outer face of the extension member and the upper face of the tab, the tool placement zone free of any obstructions so as to allow a tool to be removably placed in the tool placement zone and inserted into the at least one elongated aperture.

15. The improvement according to claim 14, wherein:
the tape member includes a plurality of apertures respectively corresponding with the plurality of indicia of the tape member for providing a user the ability to inscribe circles and arcs.

16. The improvement according to claim 14, wherein:
the tang further comprises:
a first extended position along a tape member translation path including the tang disposed a distance away from a tape measuring housing; and
a second retracted position along the tape member translation path including the tang at least partially disposed within the tape measure housing.

17. The improvement according to claim 16, wherein:
the extension member is flush against the tape measure housing when the tang is in the second retracted position.

18. A tape measure attachment device selectively couplable to a tape measure for measuring and cutting a piece of material, the tape measure attachment device comprising:
a securing portion shaped to receive a portion of a tape member of a tape measure;
an extension member coupled to the securing portion to form a joint and disposed at a substantially perpendicular orientation to the securing portion, the extension member having an outer face and a terminal end; and
a tab coupled to the terminal end of the extension member and having:

an upper face defining at least one aperture;
a first position along a tab translation path with the tab disposed at a substantially perpendicular orientation to the extension member and extending in a direction outwardly away from the outer face of the extension member; and
a second position along a tab translation path with the tab disposed at a substantially parallel orientation to the extension member.

19. A tape measure attachment device selectively couplable to a tape measure for measuring and cutting a piece of material, the tape measure attachment device comprising:
a securing portion shaped to receive a portion of a tape member of a tape measure;
an extension member coupled to the securing portion to form a joint and disposed at a substantially perpendicular orientation to the securing portion, the extension member having an outer face; and
a tab coupled to the extension member and having:
an upper face defining at least one aperture and having an upper face area defined by the peripheral outer edges of the upper face of the tab, the upper face area being substantially planar;
a first position along a tab translation path with the tab disposed at a substantially perpendicular orientation to the extension member and extending in a direction outwardly away from the outer face of the extension member; and
a second position along a tab translation path with the tab disposed at a substantially parallel orientation to the extension member.

* * * * *